(12) United States Patent
Xiao et al.

(10) Patent No.: US 8,541,349 B2
(45) Date of Patent: Sep. 24, 2013

(54) LUBRICANT-HARD-DUCTILE NANOCOMPOSITE COATINGS AND METHODS OF MAKING

(75) Inventors: T. Danny Xiao, Willington, CT (US); John Broadhead, East Point, FL (US); Xinqing Ma, Willington, CT (US)

(73) Assignee: Inframat Corporation, Farmington, CT (US)

( * ) Notice: Subject to any disclaimer, the term of this patent is extended or adjusted under 35 U.S.C. 154(b) by 719 days.

(21) Appl. No.: 11/858,750

(22) Filed: Sep. 20, 2007

(65) Prior Publication Data

US 2009/0155479 A1    Jun. 18, 2009

Related U.S. Application Data

(60) Provisional application No. 60/826,441, filed on Sep. 21, 2006.

(51) Int. Cl.
*F16C 33/12* (2006.01)
*C10M 169/04* (2006.01)
*B01F 17/00* (2006.01)
*C09D 7/00* (2006.01)
*B05D 1/08* (2006.01)
*C25D 5/48* (2006.01)

(52) U.S. Cl.
USPC ........... 508/103; 508/113; 508/154; 508/165; 508/171; 106/287.35; 427/446; 427/451; 205/220; 977/902

(58) Field of Classification Search
USPC ................. 106/287.35; 508/103, 113, 154, 508/155, 165, 166, 167, 171, 172, 173; 427/451, 446, 453; 205/220; 977/902
See application file for complete search history.

(56) References Cited

U.S. PATENT DOCUMENTS

2004/0211672 A1    10/2004    Ishigami et al.
2007/0228664 A1 *  10/2007    Anand et al. ............ 277/399

FOREIGN PATENT DOCUMENTS

| DE | 1644927 B | 5/1971 |
| DE | 4119727 | 1/2001 |
| DE | 10062490 | 10/2001 |
| EP | 0709493 A2 | 5/1996 |
| GB | 2246145 A * | 1/1992 |
| JP | 63210299 | 8/1988 |
| JP | 1068496 | 3/1989 |
| JP | 5287595 A | 11/1993 |
| WO | 2006099068 | 9/2006 |

OTHER PUBLICATIONS

PCT International Search Report dated Mar. 12, 2010 for International Application No. PCT/US2007/079155.

* cited by examiner

*Primary Examiner* — Ellen McAvoy
*Assistant Examiner* — Vishal Vasisth
(74) *Attorney, Agent, or Firm* — Cantor Colburn LLP

(57) ABSTRACT

Lubricant-hard-ductile composite coating compositions and methods of making the same are provided. In embodiment, a composite coating composition comprises: a lubricant phase for providing lubrication to a surface; a hard ceramic phase for providing structural integrity and wear resistance to the surface; and a ductile metal phase for providing ductility to the surface.

9 Claims, 7 Drawing Sheets

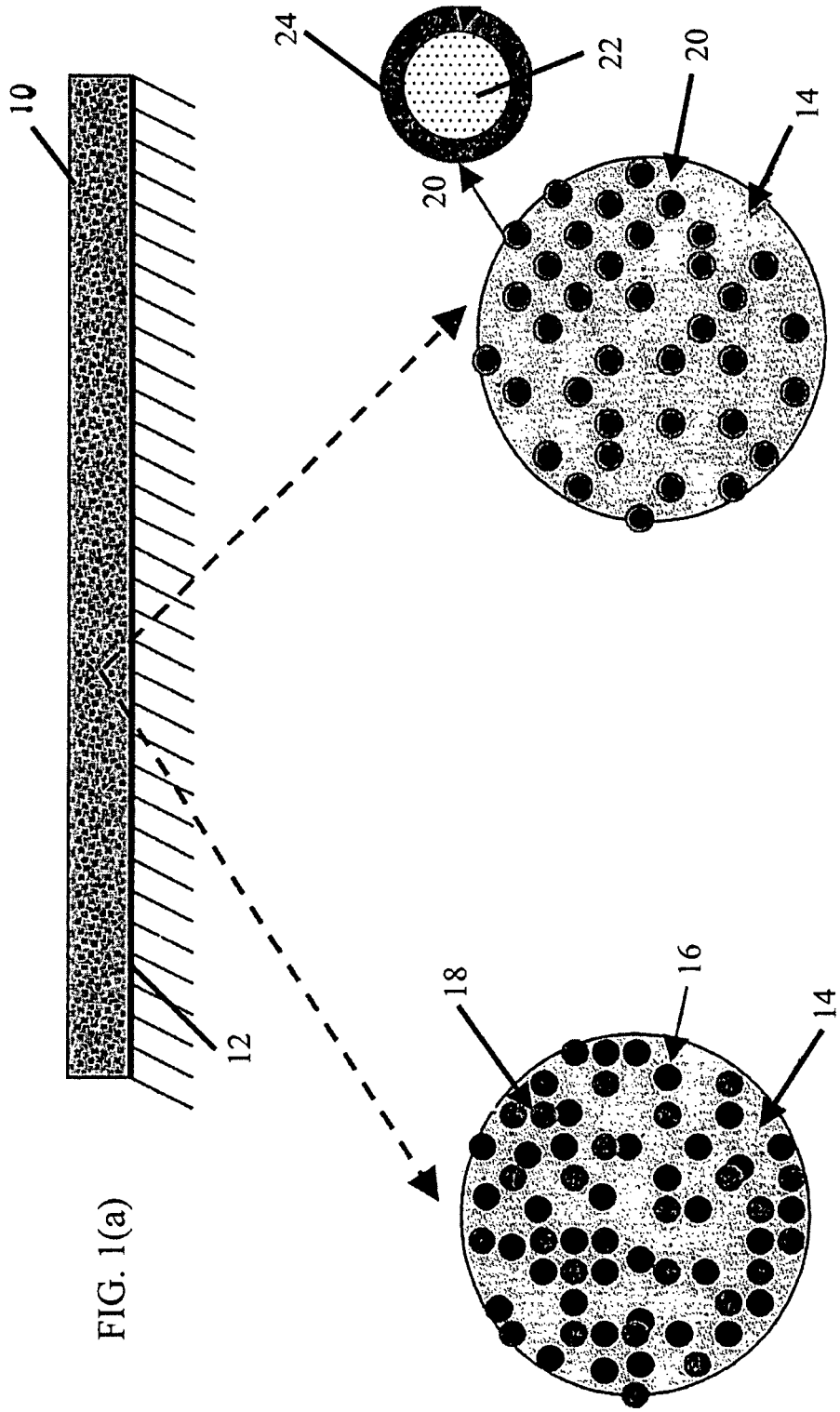

LUBRICANT-HARD-DUCTILE NANOCOMPOSITE COATINGS AND METHODS OF MAKING

CROSS REFERENCE TO RELATED APPLICATION

This application claims the benefit of U.S. Provisional Patent Application No. 60/826,441 filed Sep. 21, 2006, which is incorporated by reference herein in its entirety.

STATEMENT REGARDING FEDERALLY SPONSORED RESEARCH

The United States Government has certain rights to this disclosure pursuant to United States Navy Contract Nos. N00421-04-P-0693 and N68335-06-C-0043.

TECHNICAL FIELD

The present disclosure generally relates to coatings, and more specifically to nanocomposite coatings having high lubricity, high wear resistance, and high ductility.

BACKGROUND

In industry, coatings are applied to parts and products for various purposes. Certain coatings, for instance, are applied to surfaces to provide low friction, wear resistance, rust resistance, corrosion resistance, toughness, or other specific properties. The types of parts and products to which such coatings are applied can be metal machinery such as gears, driveshafts, ball valves, etc.

One class of coatings currently used in industry to enhance machine component reliability and reduce cycle-life cost is the engineered tribocoatings. These coatings are either thermally sprayed using chromium or tungsten carbide or are electroplated using hard chrome. While thermal spraying is advantageously a line-of-sight (LOS) process, it can only be used to coat components of simple shapes. In contrast, electroplating of hard chrome is a non-line-of-sight (NLOS) process that can be used to coat complex shapes. Unfortunately, the electroplated coatings can suffer from severe environmental concerns due to the emission of carcinogenic hexavalent chromium ions produced during manufacture.

Black oxide coatings formed by converting existing alloys to a black form of rust are also currently used in industry. Black oxide coatings offer good rust resistance and excellent lubricity in the presence of oil lubricants. Thus, black oxide coatings can be useful in components requiring tight tolerances such as rotary gears. However, such coatings are very soft and loosely bonded to the component substrates. They also offer very limited wear resistance under loss-of-lubricant conditions and very limited corrosion protection when used in corrosive systems.

Iron sulfide lubricant coatings such as FeS are used in industry due to their good lubricating properties, but they also suffer from environmental drawbacks as the manufacturing process produces harmful effluents or emissions. Plasma spray tribological coatings (with or without silver binder) containing lubricating solids distributed throughout a wear-resistant matrix of nickel-cobalt alloy-bonded chromium carbide have been developed for aerospace applications to improve low-temperature friction. These coatings, however, are expensive and lack versatility.

Hard chrome plating is a technique that has been in commercial production for over fifty years. While hard chrome plating provides a protective hard coating on machine parts, it too suffers costly environmental problems including carcinogenic hexavalent chromium ion emissions during the electroplating sequence.

BRIEF SUMMARY

Disclosed herein are ternary or triphase composite coatings. In one embodiment, a composite coating includes a lubricant phase for providing lubrication to a surface, a hard ceramic phase for providing structural integrity and wear resistance to the surface, and a ductile metal phase for providing ductility to the surface.

In another embodiment, a method of making a lubricant-hard-ductile composite coating includes combining lubricant particles and ceramic particles with an ionic metal electroplating solution, electroplating a substrate using the electroplating solution to form a metal coating on the substrate, and performing an electrophoresis procedure to cause the lubricant particles and the ceramic particles to be incorporated into the metal coating and thereby form a lubricant-hard-ductile composite coating.

In yet another embodiment, a method of applying a lubricant-hard-ductile composite coating to a substrate includes premixing a lubricant phase, a hard ceramic phase, and a ductile metal phase to form an agglomerated thermal spray feedstock and thermal spraying the agglomerated thermal spray feedstock on a surface of the substrate to form a coating thereon.

The above described and other features are exemplified by the following detailed description and figures.

BRIEF DESCRIPTION OF THE DRAWINGS

Referring now to the figures, which are exemplary embodiments and wherein like elements are numbered alike:

FIGS. 1(a), 1(b), and 1(c) illustrate embodiments of a triphase composite coating having a solid lubricant phase, a hard ceramic phase, and a ductile metal phase;

DETAILED DESCRIPTION

Figure 2B:
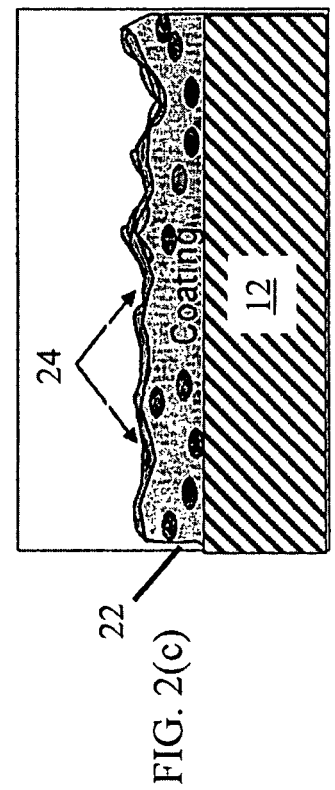
FIGS. 2(a), 2(b), and 2(c) illustrate the wear mechanisms of triphase composite coatings having different amounts of the solid lubricant phase.

Disclosed herein are environmentally friendly and relatively inexpensive lubricant-hard-ductile coating compositions and methods of making the same. The lubricant-hardductile coating compositions can comprise a solid lubricant phase, a hard ceramic phase, and a ductile metal phase. In various embodiments, the tri-phase composite coating compositions can be nanostructured or superfine. The nanostructured or superfine coating compositions are referred to herein as "composite" or "nanocomposite" coatings.

As used herein, the term "nanostructured" refers to a material having an average grain dimension of less than about 100 nanometers (nm), wherein particles having a dimension of less than about 100 nm are referred to as "nanoparticles". As used herein, the term "superfine" refers to a material having an average longest grain dimension of about 100 nm to about 0.9 micrometers (μm), wherein particles having a dimension of about 100 nm to about 0.9 μm are referred to as "superfine particles".

Examples of suitable solid lubricant phase materials for use in the coating compositions include, but are not limited to, layered hexagonal lattice structures such as boron nitride (BN), graphite (C), tungsten disulfide ($WS_2$), molybdenum disulfide ($MoS_2$), iron sulfide ($Fe_{1-x}S$, where x varies from, e.g., about 0.01 to about 0.5), calcium fluoride ($CaF_2$), iron oxide ($Fe_3O_4$), fluoropolymers such as polytetrafluoroethylene, perfluoroalkoxy resin, and fluorinated ethylene-propylene, and combinations comprising at least one of the foregoing structures.

Examples of suitable hard ceramic phase materials for use in the coating compositions include, but are not limited to, metal oxides such as alumina ($Al_2O_3$), chromia ($Cr_2O_3$), zirconia ($ZrO_2$), and ceria ($CeO_2$); carbides such as tungsten carbide (WC), titanium carbide (TiC), vanadium carbide (VC), chromium carbide ($Cr_3C_2$), tantalum carbide (TaC), and silicon carbide (SiC); nitrides such as aluminum nitride (AlN), silicon nitride ($Si_3N_4$), and zirconium nitride (ZrN); borides such as titanium diboride ($TiB_2$) and zirconium boride (ZrB); sulfides such as titanium disulfide ($TiS_2$) and niobium disulfide ($NbS_2$); and selenides such as titanium diselenide ($TiSe_2$), niobium diselenide ($NbSe_2$), and molybdenum diselenide ($MoSe_2$); and combinations comprising at least one of the foregoing ceramics. The hard lubricant phase can also include diamond-like nanoparticles.

Examples of suitable ductile metal phase materials for use in the coating compositions include, but are not limited to, indium (In), thaliun (Tl), transition metals such as cobalt (Co), nickel (Ni), iron (Fe), molybdenum (Mo), chromium (Cr), copper (Cu), tungsten (W), Tantalum (Ta), alloys of transition metals such as CoNi and NiCr, and combinations comprising at least one of the foregoing materials.

In one exemplary embodiment, the concentrations of the three phases in the coating compositions are as follows: the concentration of the solid lubricant phase present is about 1 weight (wt.) % to about 80 wt. %; the concentration of the hard ceramic phase present is about 5 wt. % to about 90 wt. %; and the concentration of the metal ductile phase present is about 10 wt. % to about 90 wt. %, wherein all percentages are based on the total weight of the coating composition.

In one exemplary embodiment, a tri-phase coating composition comprises BN, $Cr_2O_3$, and Ni or NiCr alloy. In another exemplary embodiment, a tri-phase coating composition comprises $Fe_3O_4$, $Cr_2O_3$, and Ni. In yet another exemplary embodiment, a tri-phase coating composition comprises BN, WC, and Co. In still another exemplary embodiment, a coating composition comprises BN, SiC, and Ni or NiCr alloy.

Referring now to FIG. 1(a), a lubricant-hard-ductile coating 10 is shown as being disposed upon an underlying substrate 12 such as a mechanical component or work piece. Detailed views of two embodiments of the coating 10 are further shown in FIGS. 1(b) and 1(c). In FIG. 1(b), the coating 10 includes a ductile metal matrix phase 14 in which solid lubricant nanoparticles 16 and hard ceramic nanoparticles 18 are dispersed. It is desirable that the nanoparticles 16 and 18 be substantially uniformly dispersed in the matrix phase 14. In FIG. 1(c), particles 20 comprising a hard ceramic nanoparticle core 22 and a lubricant phase coating 24 are dispersed in the ductile metal matrix phase 14. It is desirable that the particles 20 be substantially uniformly dispersed in the matrix phase 14. It is understood that the nanoparticles in these drawings could be replaced with superfine particles.

In both embodiments of FIGS. 1(b) and 1(c), the solid lubricant phase can serve to provide lubrication to the coated surface and thus reduce friction with a mating surface and provide wear resistance. The hard ceramic phase can serve to provide structural integrity and additional wear resistance to the coated surface, and the ductile metal matrix phase can serve to provide ductility to the coated surface. In a room temperature wear mechanism, a microfracture-controlled wear process can be the dominant wear mechanism for a ceramic coating due to its inherent high brittleness and low strain tolerance. In the case of a lubricant-hard-ductile nanocomposite coating, such as an electroplated BN—$Cr_2O_3$—Ni composite coating, the improved ductility and integrity of the coating can improve friction and wear properties and can reduce microfracture, delamination, and grain pullout.

Figure 2C:
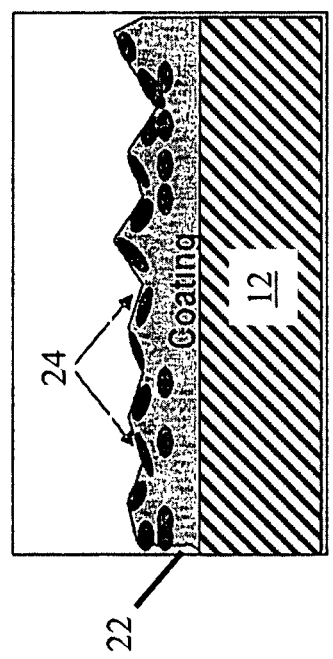
Figure 2A:
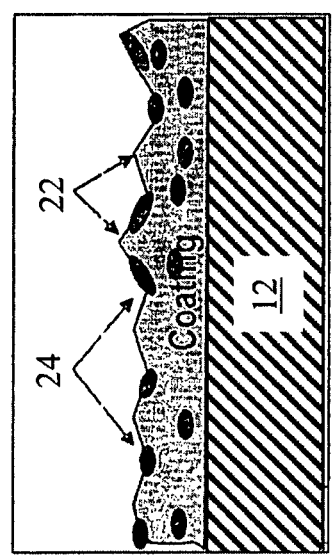

Turning now to FIGS. 2(a), 2(b), and 2(c), the wear mechanisms of lubricant-hard-ductile composite coatings having varying amounts of the lubricant phase are illustrated. Specifically, FIG. 2(a) shows a tri-phase coating having a low content of a lubricant phase 24. As shown, the wear surface of the coating primarily contains a hard ceramic phase 22, such as $Cr_2O_3$, which can result in abrasive wear between the ceramic phase 22 and a surface with which the coating mates. FIG. 2(b) shows a tri-phase coating having a higher content of the lubricant phase 24, specifically about 25 to about 75 volume (vol.) % lubricant and even more specifically about 45 to about 55 vol. %, where volume % is based on the total volume of the coating. The combination of the hard ceramic phase and the soft lubricant phase in the wear surface improves friction and wear properties. When the solid lubricant phase content is increased even further, the tri-phase coating can behave as a pure lubricant coating as shown in FIG. 2(c). As a result, the benefits of the combination of the hard ceramic phase and the soft lubricant phase can be realized.

In operation, the tri-phase coating can be applied to a surface of a substrate by a variety of techniques, including but not limited to, electrodeposition (e.g., electroplating and/or electrophoresis), electroless deposition, thermal spraying, physical vapor deposition (PVD), and chemical vapor deposition (CVD). For low cost none-line-of-sight (NLOS) applications, an electrodeposition or electroless deposition process is preferred. For line-of-sight (LOS) applications, thermal spraying is preferred. Depending on the application, the coating thickness can vary. For example, the thickness can be about 50 μm to about 70 μm, more specifically about 20 μm to about 30 μm.

Figures 3A, 3B:
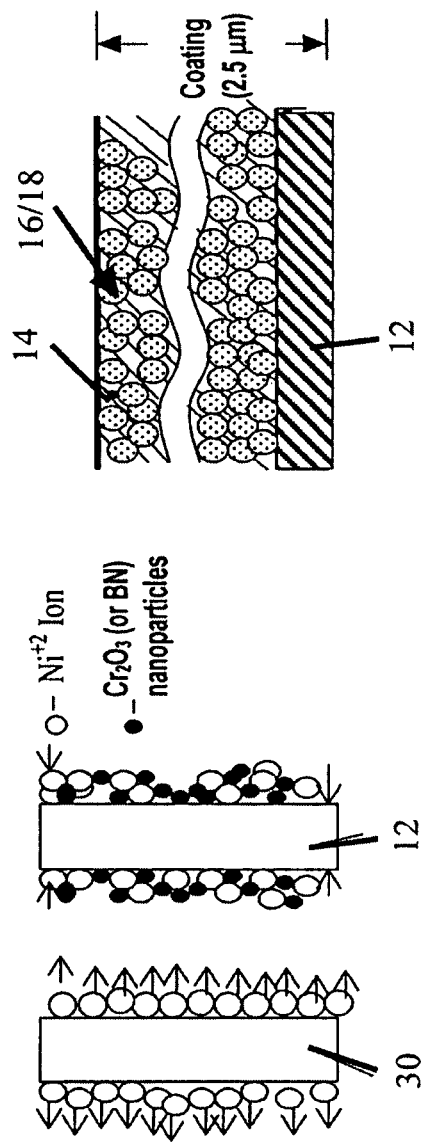
FIGS. 3(a) and 3(b) illustrate the formation of a triphase composite coating on a substrate by electrolytic codeposition.

FIG. 3(a) illustrates an exemplary embodiment of a method for forming a lubricant-hard-ductile nanocomposite coating using an electrolytic codeposition process. In the case of electroplating, a true colloidal solution 30 comprising nanoparticles can be used to achieve relatively uniform codeposition on all surfaces. The colloidal solution 30 can serve as the cathode while the substrate 12 upon which the coating is being formed can serve as the anode. To increase the surface hardness and, ultimately, the wear resistance of the resulting coating, the colloidal solution can comprise, for example, about 5 to about 50 vol. % of hard ceramic nanoparticles mixed with about 5 to about 50 vol. % of lubricant nanoparticles, and a balance of an electroplating bath, where the volume % is based on the total volume of the colloidal solution. The electroplating bath can include Ni, Co, or other similar ionic electrolyte solutions. In an alternative embodiment, the solution can include hard ceramic superfine particles and lubricant superfine particles rather than nanoparticles. When a current is applied to the colloidal solution 30, the ions in the colloidal solution 30 (i.e. the cathode) are attracted to the substrate 12 (i.e., the anode), causing the ductile metal matrix to be codeposited with the lubricant-ceramic nanoparticles on the surface of the substrate 12. As shown in FIG. 3(*b*), the resultant nanocomposite coating can include finely dispersed, wear resistant, hard lubricant (e.g., BN) and ceramic (e.g., $Cr_2O_3$) phases 16 and 18, respectively, in a ductile metal (e.g., Ni) matrix 14. It is to be understood that the dimensions of the nanoparticles and the coating thickness shown in FIG. 3(*b*) are only exemplary.

The electroplating process that implements electroplating of a species onto a conducting substrate has several process regions. The first region is the bulk electrolyte, which occupies most of the volume of the plating bath. The diffusion layer makes up the second region and is closest to the substrate surface where plating occurs. There is a concentration gradient that is established by the depletion of the ionic species being plated, and diffusion from the bulk electrolyte replenishes the depleted ionic species close to the substrate. The third region is the electrical double layer, which is discussed in detail below. Finally, there is the charge transfer interface, where electron transfer to metal ions occurs and the metal is plated onto the conducting substrate.

Including small particles in the electroplating bath can require an electrophoresis procedure to be incorporated into the electroplating process described above. The electrical and chemical parameters for electroplating and electrophoresis can be quite different. In electroplating, usually the electrolyte concentration is high, the current densities are low, the electric fields are small, and the ionic conductivity is high. In electrophoresis, usually the electrolyte concentration is low, current densities are high, electric fields are high, and electrolyte ionic conductivity is low. Thus, it is best to initially set up the electroplating parameters such that electrolyte composition, conductivity, pH, current density, temperature, additives, anions, orientation and agitation are tailored to the metal being plated, e.g., nickel. For the nickel example, the solution can have a high concentration of nickel sulfamate (e.g., ⅔ of saturation), a low pH, (e.g., 1.8 to 3.0), a low current density (e.g., 20 A/$ft^2$), and an elevated temperature (e.g., 60° C.); brighteners can be added; and the electrolyte can be stirred. These values can be modified slightly to help the electrophoresis process discussed below.

In electrophoresis, high fields with low conductivity can provide for the deposition of particles in the electrode/electrolyte interface. However, if the electroplating conditions are altered significantly to try to approach electrophoretic conditions, problems such as peeling, burning, and dendrite formation can occur. To implement the high field required for electrophoresis without altering the electroplating conditions, a radically different approach can be used. The ceramic and lubricating particles can be reduced in size to the nanoparticle size so that they are small enough to enter the electrical double layer at the electrolyte/cathode interface. To enhance and accelerate the entry of the nanoparticles into the electrical double layer, cataphoretic entities can be added to the electrolyte. The cataphoretic entities can adsorb on the surface of the nanoparticles and impart a positive charge on the surface. This surface charge can accelerate the particles into the electrical double layer. Within the electrical double layer, the particles are subjected to high fields of the order of $10^4$ to $10^6$ V/cm.

Figure 4:
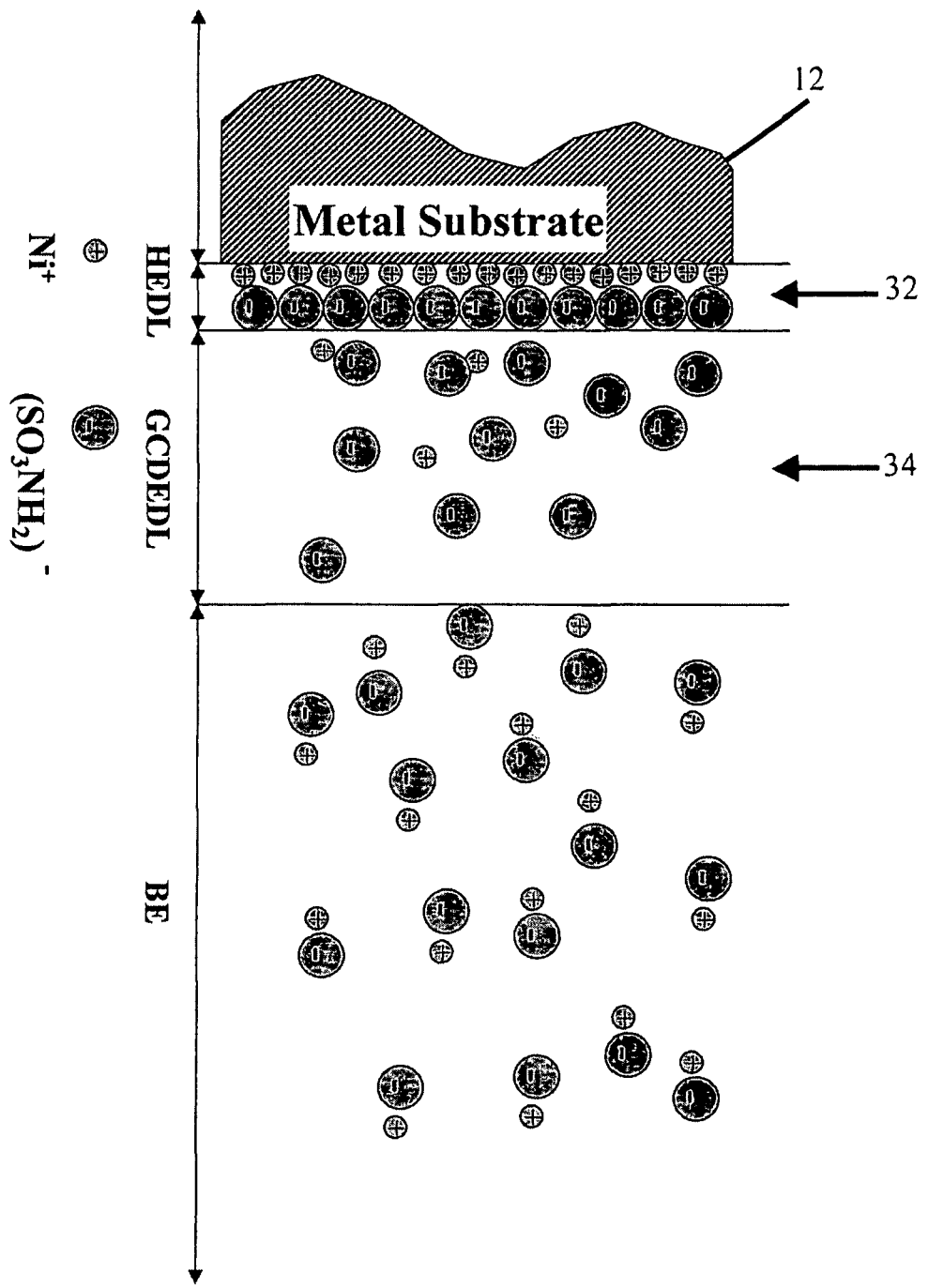
FIG. 4 illustrates the electrical double layer that forms in the area adjacent to the electroplated substrate during the electroplating process.

FIG. 4 illustrates the electrical double layer that forms in the area adjacent to the conducting substrate 12 during the electroplating process. The conducting substrate 12 is negatively charged and can attract positive ions immediately adjacent to the substrate 12. The combination of the layer of positive ions next to the negative substrate is called the compact, or Helmholtz Electrical Double Layer (HEDL) 32. Just beyond the HEDL 32, negative ions can be attracted to the layer of positive ions of the HEDL 32. Beyond this, additional positive ions can be attracted to the negative ions. The negative ions are desirably larger in size than the positive ions (making the sulfamate anion ($SO_3NH2^-$) suitable for use with the nickel cation). This pattern can repeat for multiple layers of ions, however, because the solution is dynamic, the replication of multiple layers outward from the substrate decreases as the distance increases from the substrate 12. These multiple layers can become more diffuse and are collectively referred to as the diffuse double layer or the Gouy-Chapman Diffuse Electrical Double Layer (GCDEDL) 34. Both the HEDL 32 and the GCDEDL 34 have relatively strong electric fields associated with them, making possible the difficult method of combining electrophoresis with electrodeposition.

The charge transfer interface is the plane at which electrons neutralize positive metal ions at the substrate surface and then deposit the metal on the conducting substrate 12. This is the electrodeposition step. During electroplating, if there are nano-sized particles present and suspended in the plating electrolyte, then the smallest nanoparticles can enter the region of the GCDEDL 34 and HEDL 32. If the nanoparticles have a positive surface charge (either intrinsic or imparted by additives), they are preferentially attracted to the anode in the GCDEDL 34 and HEDL 32 and driven into the substrate surface and incorporated into the electroplated metal substrate 12. This is the electrophoresis step. This process provides a method of forming a matrix of nanoparticles embedded in an electroplated metal substrate 12.

In another exemplary embodiment, the tri-phase coating is applied to a substrate by a thermal spray process. This process first involves pre-mixing sold lubricant phase, hard ceramic phase, and ductile metal phase nanoparticles and/or superfine particles to form an agglomerated thermal spray feedstock. The agglomerated feedstock particles can be used as starting materials to form the tri-phase coating on the substrate, e.g., a work piece or component. The substrate can be subjected to degreasing and coarsening by sand gritting to ensure that the ensuing coating adheres to it well. A high velocity flame, such as a plasma or high velocity oxygen fuel (HVOF) flame, can be generated by the combustion of a mixture of gases. The enthalpy and temperature can be adjusted depending on the desired properties of the particles, e.g., the melting temperature, by using different gas ratios and flow rates. The feedstock can then be fed into the flame at a controlled feed rate via a co-axial powder port or external feeding port. As a result, it melts and impacts on the target substrate to form a coating or film thereon. The coating thickness can be controlled based on the number of coating passes. In some cases, the resultant coating can also be post heat treated in an annealing procedure.

Figure 5:
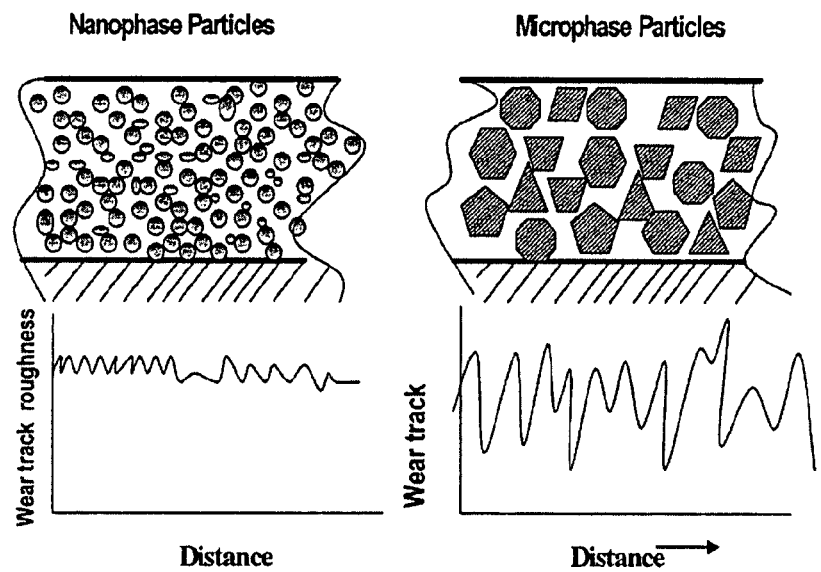
FIG. 5 graphically illustrate the effect of particle size on the wear rate of a triphase composite coating.

Advantageously, the tri-phase coatings described herein have relatively low coefficients of friction and low wear rates and thus can minimize heat generation at contact surfaces and can enhance the life and reliability of the underlying substrate. Due to the use of nanoparticles in the lubricant phase and the hard ceramic phase, the lubricant-hard-ductile coating, e.g., BN—$Cr_2O_3$—Ni, can have superior metallurgical bonds over existing coatings. This superior bonding can prevent coating delamination and lubricant nanoparticle pullout. Also, the coefficient of friction of the tri-phase coating has been found to decrease with grain size. The effect of grain size on the properties of the tri-phase coating can be better understood by turning to FIG. 5. As shown, the wear tracks of the lubricant-hard-ductile nanocomposite coating have a lower surface roughness compared to existing black oxide coatings and electrodeposited coatings containing 0.5 to 2 μm silicon carbide particles. Moreover, the particles in these existing coatings are generally not metallurgically bonded to the coating matrix, which can lead to particle pullout and increased friction coefficients and wear rates. Another advantage of using nanoparticles in the lubricant and ceramic phases is because they can be driven into the electrical double layer at the electrode interface.

The invention is further illustrated by the following non-limiting examples.

Example 1

In this example, three different electroplating bath compositions were evaluated. In creating a $Fe_3O_4$—WC—Ni solution (the first composition), $Fe_3O_4$ and WC nanoparticles were ball milled to break down any agglomerated particles: powders. Then 100 grams of $Fe_3O_4$ and 100 grams of de-agglomerated WC were dispersed in 2000 grams of nickel sulphamate. Brightener additives (20 grams sodium saccharin) and "leveling agent" (1 gram DARVAN® ammonium polymethacrylate surfactant commercially available from R. T. Vanderbilt Company, Inc.) were added to the solution, followed by deionized (DI) water to form a 5-liter total volume. Finally 0.5 grain of 1,4-butyne-2-diol cataphoretic additive was added. This component specifically adsorbs to the nanoparticles and imparts a positive charge to the species. The surface charge on the particles drives them towards the cathode of the bath. The bath was then maintained at a buffered pH of about 2.7 by the addition of boric acid and an appropriate amount of sulfamic acid (see details in the plating process section), and the bath electrolyte was maintained at 60° C. and stirred during the entire electroplating period.

In creating a Fe3O4—$Cr_2O_3$—Ni solution (the second composition), 100 grams of $Fe_3O_4$ and 100 grams of $Cr_2O_3$ nanoparticles were mixed with 100 grams of nickel sulphamate and a desired amount of surfactants (including DARVAN® sodium polymethancarylate surfactant and sodium saccharin), as well as 400 milliliters (mL) of DI water. This mixture was then transferred into a ball-milling jar and milled overnight. Different amounts of the solution mixture were added to 2000 grams of nickel sulphamate. Other plating additives such as the leveling agent and the brightener were added to each solution. Again, 0.5 gram of 1,4-butyne-2-diol cataphoretic additive was added to each solution. Each solution was made up with 2000 grams of nickel sulfamate and DI water to form 5-liter electroplating baths. Boric acid and an appropriate quantity of sulfamic acid were added to maintain a buffered pH of about 2.7. The electroplating solution was maintained at 60° C. and was stirred during the entire electroplating process.

In creating a BN—$Cr_2O_3$—Ni solution (the third composition), 100 grams of BN and 100 grams of $Cr_2O_3$ nanoparticles were mixed with 100 grams of nickel sulphamate, 400 mL DI water, and the same surfactants mentioned above. This mixture was then transferred into a ball-milling jar and milled overnight. Different amounts of the solution mixture were added to 2000 grams of nickel sulphamate. Other plating additives such as leveling agent and brightener plus 0.5 gram of 1,4-butyne-2-diol were added to enhance electrophoresis. Each solution was made up with 2000 grams of nickel sulphamate and DI water to produce 5-liter plating baths. Boric acid and an appropriate quantity of sulfamic acid were added to maintain a buffered pH of about 2.7, and the solution was stirred and maintained at 60° C. during the entire electroplating process. The BN—$Cr_2O_3$ concentrations in the various baths were 10 grams/Liter (g/L), 15 g/L, 20 g/L, 25 g/L, 30 g/L, 35 g/L, and 40 g/L, respectively. This third plating electrolyte composition is the preferred embodiment of the systems.

The final samples from all three bath compositions were annealed at 200° C. for 2 hours.

A prototype plating line was developed for the electroplating procedure that includes the following cells:

(1) Degreasing cell—a bath for substrate cleaning that contains 30 weight % sodium hydroxide in DI water based on the weight of the total solution, wherein the bath has a power supply and the buss arrangement is such that the working piece is suspended in the sodium hydroxide, as the anode, between either stainless steel or nickel electrodes;

(2) Neutralizing cell—a bath for substrate treatment after degreasing that contains 30 weight % hydrochloric acid in DI water based on the weight of the total solution;

(3) Rinsing cell—DI water only; and (4) Activation cell—a WOOD STRIKE electrolyte commercially available from Technics, Inc. of Cransto, R.I. (aqueous nickel nitrate solution having a low pH of 2.0) for activation immediately prior to electroplating, wherein the bath has a power supply a power supply and the buss arrangement is such that the working piece is the cathode in the circuit between two porous nickel anodes.

Example 2

In this example, a BN—$Cr_2O_3$—Ni coating was applied to a metal substrate. The base metal substrate included carbon steel and hardened AS143400 gear alloys. The first step was to remove the surface dirt of the substrate by rubbing it against sandpaper, followed by acetone washing and rinsing with DI water. Degreasing was thereafter performed using the following steps:

Step 1. Following removal of loose particles from the sample surface (e.g., by light san blasting), the sample was connected to the degreasing bath sample holder.

Step 2. The samples were anodized for 20 to 30 minutes in the degreasing bath between porous nickel cathodes. The current applied was about 1.6 A for a sample of about 6 square inches. The current was "tuned" based on the alloy of the substrate. A successful "cleaning" was indicated by a faint cloud of dark particles surrounding the sample.

Step 3. The sample was disconnected and removed from the degreasing bath.

After degreasing, rinsing was performed by immersing the sample in the rinsing bath and shaking for 10 min. Neutralizing was then performed by immersing the substrate in the neutralizing bath and shaking for 10 min. The sample was rinsed once again by immersing the sample in the rinsing bath and shaking for 10 min.

Next, activation was performed using the following steps:

Step 1. The sample was mounted in the activation bath between porous nickel anodes.

Step 2. The sample was electroplated by applying a current density to the activation bath in the range of 20 to 100 amperes per decimeter squared (A/dm$^2$) (150 to 900 A/ft$^2$). Only a very thin layer of "strike" nickel, barely enough to give the sample a "color" was desired. Thus, the plating only lasted a few minutes. A bright light was focused on the sample so that the color change could be observed.

Step 3. The "strike" plated sample was immediately transferred to the main plating bath without shaking off the excess electrolyte to allow a film of strike electrolyte to "carry-over" with the sample. The carry-over electrolyte protected the sample from air oxidation.

Subsequently, electroplating was performed using the following steps:

Step 1. Just as the piece to be electroplated was inserted into the bath, the cataphoretic additive, i.e., 1,4-butyne-2-diol was added and dissolved in the bath electrolyte. This maneuver allowed the sample to enter the bath electrolyte without major exposure to air (remember that the excess electrolyte from the activation bath has not been removed) and the cataphoretic additive to be introduced as close as possible to the sample to be electroplated. Thus, the sample was quickly transferred from the activation bath. The sample was immediately immersed in the plating bath electrolyte so that all surfaces to be plated were below the electrolyte surface. A good flow of the electrolyte was maintained at and next to the sample, including the aforementioned cataphoretic additive. The slurry nanoparticles were kept in suspension.

Step 2. The plating current density applied to the plating bath was adjusted (slowly raised over a period of 15 to 30 seconds) to be in the final range of 20 to 50 ampere per square foot (A/ft$^2$). This current density has proven to be most successful. The electrodeposition current was monitored using an amperometer with an accuracy of 0.1 milliampere (mA) under a controlled temperature of 60° C. and at a buffered and measured pH of 2.7. The current was maintained as high as possible to help the electrophoresis effect on the nanoparticles without interfering with the good electroplating of nickel. The plating power supply was checked to ensure it would cope with the upper limit of the current. Plating time was selected based on the desired thickness of the plated metal.

Step 3. At the completion of the plating time, the current was reduced to close to zero over a time of 15 to 30 seconds. The sample was then removed, washed, inspected, and heat treated (annealed) at 200° C. for 2 hours. Finally, the pH of the electrolyte was checked to be sure it had not gone above 3.0.

The foregoing procedure was repeated using different BN—Cr$_2$O$_3$—Ni electroplating baths. The compositions of each bath are shown in Table 1 below. In the each bath, the weight ratio of BN to Cr$_2$O$_3$ was 1:1, thus the g/L concentration was ½ of each component in the solution (e.g., the 20 g/L solution contained 10 g/L Cr$_2$O$_3$ and 10 g/L BN).

TABLE 1

| Additives | Grams of nanoparticles per liter of nickel solution (g/L) | | | | | | | |
|---|---|---|---|---|---|---|---|---|
| | 0 | 5 | 10 | 15 | 20 | 25 | 30 | 35 | 40 |
| BN/Cr$_2$O$_3$ added | ✓ | | ✓ | ✓ | ✓ | ✓ | ✓ | ✓ | ✓ |

The plated BN—Cr$_2$O$_3$—Ni nanocomposite coatings formed above were relatively smooth, uniform, and dense and had a metallic or satin finish. Further, there was no evidence of non-uniformity in sharp-cornered angles. Without nanoparticulate additives (Cr$_2$O$_3$ and BN), the pure nickel plated surface was relatively bright, smooth, and dense and had a uniform thickness throughout all sections of the coated surfaces. As the percentage of both Cr$_2$O$_3$ and BN nanoparticles increased in the plating solution, the gloss appearance of the coating gradually started to disappear. For the 40 g/L nanoparticles solution, the coating had a satin finish, high density, and other desirable characteristics.

Example 3

Figure 6:
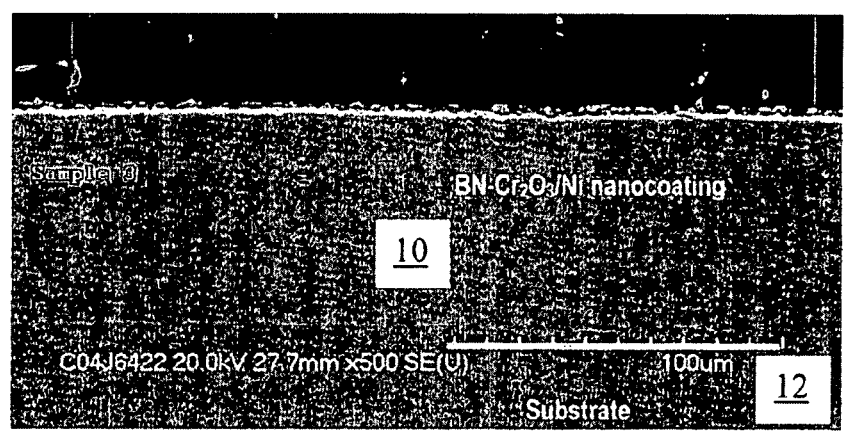
FIG. 6 depicts a scanning electron micrograph of a triphase composite coating disposed on a work piece substrate.
Figure 7:
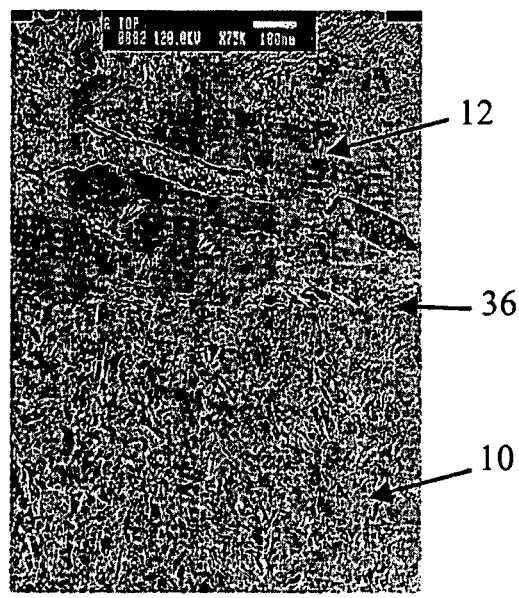
FIG. 7 depicts a transmission electron micrograph of a triphase composite coating disposed on a steal work piece substrate.

As shown in FIG. 6, a scanning electron microscopy (SEM) micrograph was taken of a cross-section of one BN—Cr$_2$O$_3$—Ni nanocomposite coating 10 formed on the gear substrate 12. The SEM micrograph revealed that the coating 10 had a very uniform structure throughout its cross-section, with an excellent coating to substrate interface. A transmission electron microscopy (TEM) micrograph was also taken of the cross-section at 75,000× magnification, as shown in FIG. 7. The TEM micrograph revealed excellent bonding between the substrate 12 and the coating 10 at the coating-substrate interface 36. It appeared that total atomic bonding of the coating was achieved. As shown, the gear substrate 12 had a very large grain structure while the nanocomposite coating 10 had a very small grain structure.

Figure 8:
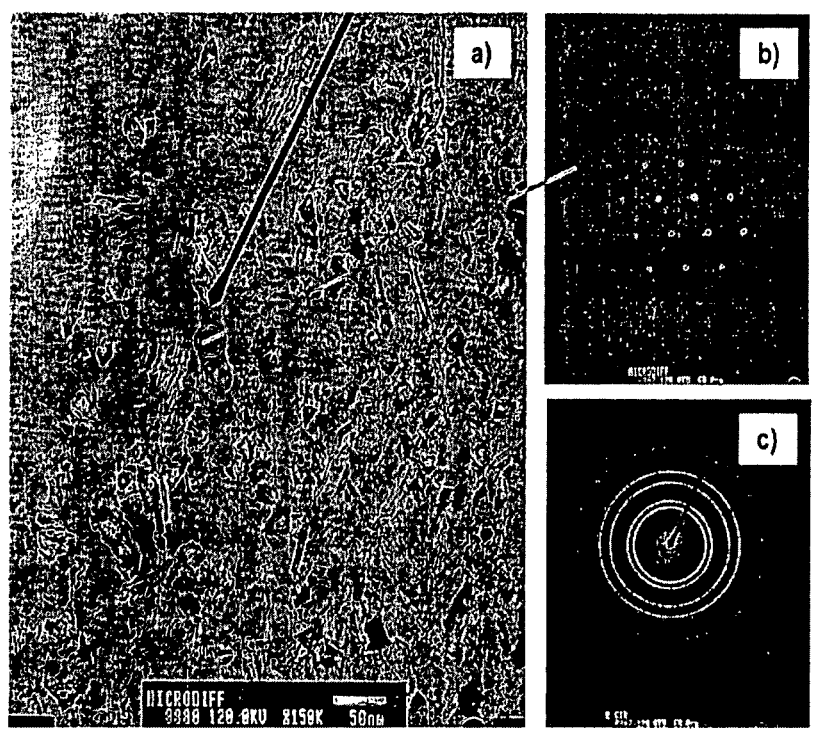
FIG. 8 depicts another transmission electron micrograph of a triphase composite coating.

FIG. 8 depicts a more detailed TEM micrograph taken at 150,000× magnification and electron diffraction patterns of the BN—Cr$_2$O$_3$—Ni nanocomposite coating. The micrograph revealed a polycrystalline nanostructure with two types of contrasts: gray crystals (matrix) and dark color dispersed grains.

Selected area diffraction of the coating revealed a complex polycrystalline structure. Preliminary diffraction analysis indicated that this complex ring structure probably resulted from a combination of grains comprising face-centered cubic (fcc) Ni (a=3.5238 Angstroms (Å)), rhombohedral Cr$_2$O$_3$ (a=4.95876 Å, c=13.59420 Å), hexagonal BN (a=2.504 Å, c=6.661 Å or c=10.01 Å), and Ni$_x$P$_y$ phases. A micro-micro diffraction pattern of a typical dark colored grain is shown in FIG. 7b. Indexing of this pattern suggests that it is a Cr$_2$O$_3$ grain with diffraction patterns. The particle sizes of these grains range from 2 to 50 nm, with most of the particle being less than 20 nm.

Microhardness was measured at a cross-section of the surface of each coated substrate using Vickers hardness machine. In the optimization experiments, hardness is one of the most important parameters used to determine the coating quality, as it relates to coating density and strength. In the analysis, the coating hardness values as a function of the BN:$Cr_2O_3$ ratio were plotted as a function of particulate (BN:$Cr_2O_3$ weight ratio of 1:1) and as a function of heat treatment temperature. Depending on the concentration of the BN—$Cr_2O_3$ nanoparticles in the bath, the hardness of the coating varied from 400 to 1,000 Vickers Hardness Number (VHN).

Figure 9:
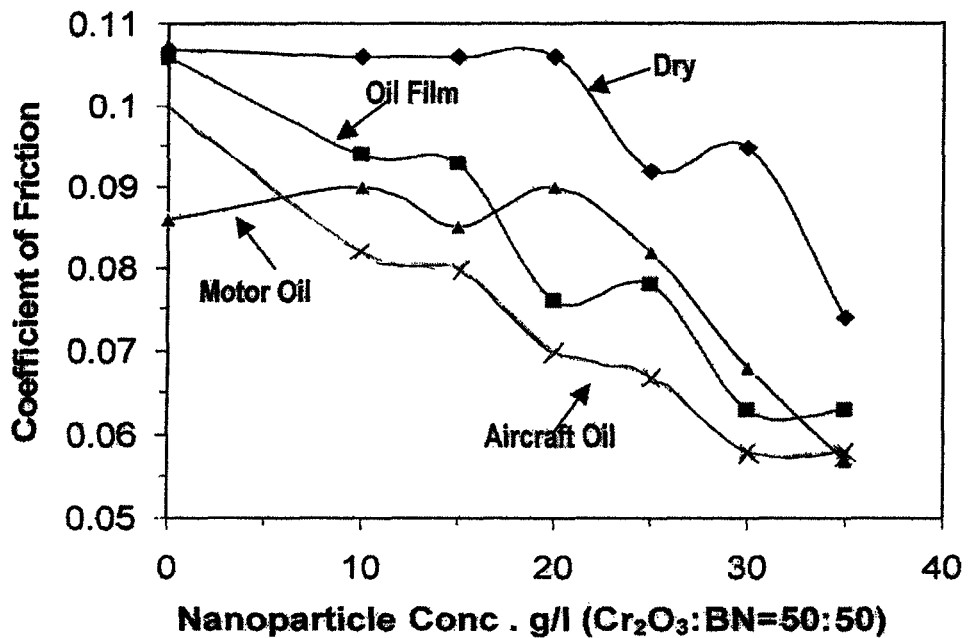
FIG. 9 graphically illustrates the friction coefficient of a triphase composite coating as a function of degree of lubrication.

The nanocomposite coated samples were subjected to "pin on disk" friction measurements. Measurements were taken using a ¼ inch silicon nitride ball pressed to the sample surface with a 4 kilogram force. A transducer measured the friction drag, and the coefficient of friction was calculated from this data. FIG. 9 illustrates the friction coefficients of the BN—$Cr_2O_3$ nanocomposite coatings under different lubricating conditions. Samples were measured with (1) no oil (completely dry), (2) full lubrication in Castrol Society of Automotive Engineers (SAE) 10W-40 oil (motor oil), (3) full lubrication in aircraft oil (Mil. Spec. aircraft oil), and (4) with a thin oil film (carefully wiped dry with tissue). The data indicated that BN provided a dry lubricity when incorporated in the nickel matrix. The concentration levels in the plating electrolyte solution needed to be above 25 g/L $Cr_2O_3$+BN to provide the lubricity. It is of note that the coefficient of friction values of the "oil film" were close to the full lubrication values. This test also revealed that at low concentrations of BN, there was a difference in coefficients of friction between experiments performed in motor oil and those performed in aircraft oil. However, at higher concentrations, this difference diminished, and for a 35 g/L solution, there was no difference at all. At this BN concentration, solid lubricity of the coating became very effective.

Figure 10:
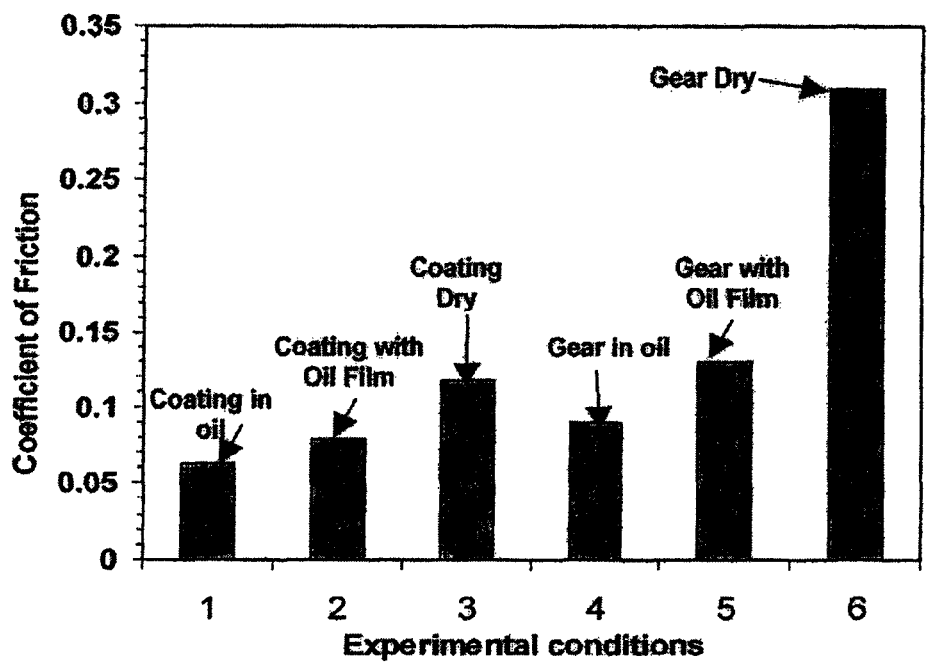
FIG. 10 graphically illustrates the effects of different lubrication phases on the friction coefficient.

In consideration of these good coefficient of friction values, experiments were performed to compare with the gear substrates (without any coatings) in different conditions, including dry, fully lubricated, and with a thin oil film. The results of these experiments are illustrated in FIG. 10.

As shown, the coating coefficients for the coated gear substrate were 0.063 with full oil lubrication, 0.079 with thin oil film lubrication (wiped off), and 0.118 with absolute dry lubrication. However, the uncoated gear substrate had relatively higher coefficients of friction in all conditions compared to the electroplated substrates, e.g., 0.09 with full oil lubrication, 0.13 with thin oil film lubrication, and 0.31 with absolute dry lubrication. It should be emphasized that the unlubricated coatings (with only a thin oil film) had similar coefficients of friction compared to those fully oil lubricated uncoated-gear substrates. During experiments, no noise was observed in all cases when nanocomposite coated substrates were used. However, it should also be noted that the 0.13 coefficient of friction was only an estimation for the first 10 minutes. Due to associated noises after 10 minutes, the experiment was shut down. There were also loud noises associated with uncoated gears in both thin oil film and dry conditions, and after a period, the samples got so hot the experiments were stopped.

Durability evaluations of the BN—$Cr_2O_3$—Ni nanocomposite coating in comparison with a commercial black oxide coating were performed using sliding wear, ring-on-block wear, tensile bond strength, and shear bond strength tests. When the sliding wear experiments were performed, past experience demonstrated that the harder materials wore less than the softer materials. However, when the BN—$Cr_2O_3$—Ni nanocomposite coated samples (microhardness=470 VHN) were slid (disk) against high hardness silicon nitride balls (pin microhardness>1000 VHN) in slide wear experiments, no losses were detected of the BN—$Cr_2O_3$—Ni coating, but there was significant weight loss of the silicon nitride ball.

The sliding wear results of the BN—$Cr_2O_3$—Ni coating in comparison with the black oxide coating are shown in Table 2 below. Experiments were conducted using an ultrathin oil for both coatings. After three tests, the black oxide coating had been worn through and had experienced a weight loss of 2.08 milligrams (mg) and a wear rate of 0.0116 mg/min. In contrast, there was no detectable weight loss of the BN—$Cr_2O_3$—Ni nanocomposite samples after 14 hours (h) of testing for the 150-µm thick film and after 100 hours for the 2.5-µm thick film.

TABLE 2

| Tests | Commercial black oxide | | BN—$Cr_2O_3$—Ni nanocomposite | |
|---|---|---|---|---|
| | Wear loss | Wear rate | Wear loss | Wear rate |
| Wear test in thin oil film | 2.08 mg (3 h) | 0.0116 mg/min | Non-detectable for 150 µm film (14 h) Non-detectable for 2.5 µm film (100 h) | Non-detectable for 150 µm film Non-detectable for 2.5 µm film |

The ring-on-block wear results of the BN—$Cr_2O_3$—Ni coating in comparison with the black oxide coating are shown in Table 3 below. The samples were subjected to compressive and shear forces. In the case of black oxide, after 12 hours of testing, there was no coating left, and there was severe material removal of the substrate. The experiment was continued overnight. The next morning, the mounting pins were broken due to high friction associated with the two mating parts, which were both coated with black oxide. The black oxide coating exhibited a wear loss of 75.60 mg after 18 hours and a wear rate of 0.21 mg/min. The weight loss of the ring could not be measured due to the pins stocked on the inside On the other hand, when examining the BN—$Cr_2O_3$—Ni nanocomposite coated gear substrate, there was only a slight mark (just a color change) on the block side and no scratch at all on the ring side for the 150-µm thick coating. Since there was no coating damage at all, the experiment was still running the next morning, while the other side of the black oxide coated sample had already automatically stopped due to broken pins. There also was not any detectable weight loss at all on both ring and blocks for the 150-µm thick BN—$Cr_2O_3$—Ni coating.

For the 2.5-µm thick BN—$Cr_2O_3$—Ni coating, there was a small wear loss, of 0.7 mg after a 5-hour experiment. The wear rate was calculated to be approximately 0.0023 mg/min, more than 91 times smaller than the wear rate of the commercial black oxide coated sample.

TABLE 3

| Test conditions | Commercial black oxide (18 h) | | BN—Cr$_2$O$_3$/Ni Nanocomposite | |
|---|---|---|---|---|
| | Wear loss | Wear rate | Wear loss | Wear rate |
| Wear test in thin oil film | 75.60 mg (18 h) | 0.21 mg/min | Non-detectable for 150 μm film (18 h) | Non-detectable for 150 μm film |
| | | | 0.7 mg for 2.5 μm film (5 h) | 0.0023 mg/min for 2.5 μm film |

All the tensile bond strength data for the BN—Cr$_2$O$_3$—Ni nanocomposite coated samples exceeded the glue tensile strength of 12,000 psi. Thus, the BN—Cr$_2$O3/Ni coating exhibited high tensile bond strength and most likely will not have spallation problems during service. In contrast, the black oxide coated sample could not be tested since it was too porous. Thus, glue could penetrate into the coating to bond the substrate surface, resulting in false readings. However, using a razor blade to scratch and remove the black oxide coating indicated the black oxide bond strength to be extremely low.

Using the shear bond strength test, all the samples had glue failures at a 5,900 psi load. Thus, it can be concluded that the BN—Cr$_2$O$_3$—Ni nanocomposite coating had a shear bonding strength of greater than 5,900 psi.

Example 4

A Sultzer Metco DIAMOND JET HVOF system with a DJ2700 hybrid gun was employed for the thermal spraying of an agglomerated feedstock comprising WC, 12 weight (wt) % Co, and 1 wt % BN (spherical, spray dried). The WC particles ranged in size from 50 to 100 nm. The agglomerated feedstock particles ranged in size from 15 to 35 μm. Propylene and oxygen were used as the fuel gases. The resultant coating was about 150 to 250 μm thick and had a porosity of less than 1%. The spray parameters are given as follows:
Oxygen flow and pressure: 150 psi and 580 standard cubic foot per hour (scfh)
Propylene flow and pressure: 100 psi and 175 scfh
Air flow and pressure: 100 psi and 860 scfh
Spray distance: 10 inches
Powder feeding rate: 5 lb/hr Example 5

A Sulzer Metco 9M plasma spray system with a 9 MB gun was employed for the spraying of an agglomerated feedstock comprising 80 wt % Cr$_3$C$_2$, 20% wt % Ni$_{80}$Cr$_{20}$, and 1 wt % BN (spherical., spray dried). The agglomerated feedstock particles ranged in size from 25 to 45 μm. Argon and hydrogen were used as the working gases. The resultant coating was about 200 to 250 μm thick and had a porosity of less than 2%. The plasma spray parameters are given as follows:
Ar flow and pressure: 100 psi and 140 scfh
H$_2$ flow and pressure: 50 psi
Plasma power: 500 A/55V
Spray distance: 2.5 inches
Powder feeding rate: 6 lb/hr Example 6

A Sulzer Metco 9M plasma spray system with a 9 MB gun was employed for the spraying of an agglomerated feedstock containing WC, 12 wt % Co, and 1 wt % BN (spherical, spray dried). The WC particles ranged in size from 50 to 100 nm. The agglomerated feedstock particles ranged in size from 25 to 45 μm. A mixture of argon and hydrogen was used as the working gas. The resultant coating was about 200 to 250 μm thick and had a porosity of less than 2%. The spray parameters are given as follows:
Ar flow and pressure: 100 psi and 80 scfh
H$_2$ flow and pressure: 50 psi
Plasma power: 400 A/60V
Spray distance: 3 inches
Powder feeding rate: 6 lb/hr As used herein, the terms "a" and "an" do not denote a limitation of quantity, but rather denote the presence of at least one of the referenced items. Moreover, the endpoints of all ranges directed to the same component or property are inclusive of the endpoint and independently combinable (e.g., "about 5 wt % to about 20 wt %," is inclusive of the endpoints and all intermediate values of the ranges of about 5 wt % to about 20 wt %). Reference throughout the specification to "one embodiment", "another embodiment", "an embodiment", and so forth means that a particular element (e.g., feature, structure, and/or characteristic) described in connection with the embodiment is included in at least one embodiment described herein, and might or might not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:
1. A composite coating composition comprising:
a ductile metal phase for providing ductility to a surface, wherein the ductile metal phase comprises a compound selected from the group consisting of a transition metal, Co, Ni, Fe, Mo, Cr, Cu, W, Ta, In, Tl, an alloy of metals or transition metals, or a combination comprising at least one of the foregoing;
a lubricant phase comprising particles having a dimension of less than 100 nanometers ("nanoparticles") distributed in the ductile metal phase for providing lubrication to the surface; and a hard ceramic phase comprising particles having a dimension of less than 100 nanometers distributed in the ductile metal phase for providing structural integrity and wear resistance to the surface, wherein said coating has a Vickers Hardness Number of 400-1000.

2. The composite coating composition of claim 1, wherein the hard ceramic phase comprises nanoparticles at least partially coated with the lubricant phase and distributed in the ductile metal phase.

3. The composite coating composition of claim 1, wherein the lubricant phase comprises a compound selected from the group consisting of BN, $Fe_{1-x}S$ where x is about 0.01 to about 0.5, $MoS_2$, $WS_2$, $TiS_2$, $NbS_2$, $TiSe_2$, $NbSe_2$, $MoSe_2$, $TaS_2$, $TaSe_2$, graphite, $CaF_2$, $Fe_3O_4$, a fluoropolymer, or a combination comprising at least one of the foregoing.

4. The composite coating composition of claim 1, wherein the hard ceramic phase comprises a compound selected from the group consisting of $Al_2O_3$, $Cr_2O_3$, $ZrO_2$, $CeO_2$, WC, TiC, VC, $Cr_3C_2$, TaC, SiC, aluminum nitride, silicon nitride, zirconium nitride, $TiB_2$, zirconium boride, diamond nanoparticles, or a combination comprising at least one of the foregoing.

5. The composite coating composition of claim 1, wherein the composite coating is a nanostructured coating comprising a BN phase, a $Cr_2O_3$ phase, and a Ni phase.

6. The composite coating composition of claim 1, wherein the composite coating is a nanostructured coating comprising a $Fe_3O_4$ phase, a $Cr_2O_3$ phase, and a Ni phase.

7. The composite coating composition of claim 1, wherein the composite coating is a nanostructured coating comprising a BN phase, a WC phase, and a Co phase.

8. The composite coating composition of claim 1, wherein the composite coating is a nanostructured coating comprising a BN phase, a $Cr_2O_3$ phase, and a NiCr phase.

9. The composite coating composition of claim 1, wherein the composite coating is a nanostructured coating comprising a BN phase, a SiC phase, and a Ni or NiCr phase.

* * * * *